(12) United States Patent
Grayson et al.

(10) Patent No.: US 11,283,758 B2
(45) Date of Patent: Mar. 22, 2022

(54) TECHNIQUES TO FACILITATE OPENROAMING INTEGRATION INTO A WIRELESS ROAMING INTERMEDIARY EXCHANGE DATA-CLEARING AND FINANCIAL-SETTLEMENT ARCHITECTURE

(71) Applicant: Cisco Technology, Inc., San Jose, CA (US)

(72) Inventors: Mark Grayson, Maidenhead (GB); Bart A. Brinckman, Nevele (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/989,321

(22) Filed: Aug. 10, 2020

(65) Prior Publication Data

US 2021/0288936 A1    Sep. 16, 2021

Related U.S. Application Data

(60) Provisional application No. 62/988,451, filed on Mar. 12, 2020.

(51) Int. Cl.
| | | |
|---|---|---|
| *G06F 15/16* | (2006.01) | |
| *H04L 61/4511* | (2022.01) | |
| *H04L 29/06* | (2006.01) | |
| *H04L 61/58* | (2022.01) | |
| *H04L 61/4552* | (2022.01) | |

(52) U.S. Cl.
CPC ...... *H04L 61/1511* (2013.01); *H04L 61/1552* (2013.01); *H04L 61/6009* (2013.01); *H04L 63/08* (2013.01)

(58) Field of Classification Search
CPC ............. H04L 61/1511; H04L 61/1552; H04L 61/6009; H04L 63/08
USPC ........................................................ 709/245
See application file for complete search history.

(56) References Cited

U.S. PATENT DOCUMENTS

| | | | |
|---|---|---|---|
| 7,231,452 B2 * | 6/2007 | Ananda | ............. H04L 29/12009 370/392 |
| 8,434,132 B2 | 4/2013 | Gupta | |
| 8,874,718 B2 * | 10/2014 | Yang | ................... H04L 61/1511 709/223 |

(Continued)

OTHER PUBLICATIONS

L. Daigle et al., "Domain-Based Application Service Location Using SRV RRs and the Dynamic Delegation Discovery Service (DDDS)", Network Working Group, Request for Comments: 3958, Category: Standards Track, Jan. 2005, 25 pages.

(Continued)

*Primary Examiner* — Moustafa M Meky
(74) *Attorney, Agent, or Firm* — Edell, Shapiro & Finnan, LLC (57) ABSTRACT

Presented herein are techniques to facilitate OpenRoaming integration into a Wireless Roaming Intermediary Exchange (WRIX) data-clearing and financial-settlement architecture. In one example, a method is provided that may include querying, by an application endpoint, a Domain Name System (DNS) server to determine support for a service for a domain; and obtaining, by the application endpoint from the DNS server, an explicit indication that one of: the service is not supported for the domain; or the service is proprietary and is supported for the domain.

20 Claims, 5 Drawing Sheets

(56) References Cited

U.S. PATENT DOCUMENTS

| | | | | |
|---|---|---|---|---|
| 10,091,243 | B2* | 10/2018 | Froelicher | H04L 63/205 |
| 10,375,117 | B2* | 8/2019 | Froelicher | H04L 67/42 |
| 10,880,334 | B2* | 12/2020 | Froelicher | H04L 67/42 |
| 2003/0172145 | A1* | 9/2003 | Nguyen | H04L 12/1403 709/223 |
| 2004/0107287 | A1* | 6/2004 | Ananda | H04L 29/1233 709/230 |
| 2013/0198269 | A1* | 8/2013 | Fleischman | H04L 61/20 709/203 |
| 2017/0310484 | A1* | 10/2017 | Kaliski, Jr. | H04L 61/305 |
| 2019/0036976 | A1* | 1/2019 | Froelicher | H04L 67/42 |
| 2019/0306199 | A1* | 10/2019 | Froelicher | H04L 63/20 |
| 2020/0113001 | A1* | 4/2020 | Shimojou | H04W 68/005 |

OTHER PUBLICATIONS

P. Faltstrom et al., "Internationalizing Domain Names in Applications (IDNA)", Network Working Group, Request for Comments: 3490, Category: Standards Track, Mar. 2003, 22 pages.

M. Mealling, "Dynamic Delegation Discovery System (DDDS) Part Three: The Domain Name System (DNS) Database", Network Working Group, Request for Comments: 3403, Obsoletes: 2915, 2168, Category: Standards Track, Oct. 2002, 14 pages.

Wikipedia, "Public key infrastructure", https://en.wikipedia.org/wiki/Public_key_infrastructure, Feb. 25, 2020, 9 pages.

J. Kunze et al., "The ARK Identifier Scheme", draft-kunze-ark-23, Network Working Group, Internet-Draft, Intended status: Informational, Dec. 20, 2019, 40 pages.

WBA Roaming Work Group, "WRIX Umbrella Document", Version: 2.0, Nov. 2019, 42 pages.

WBA—Wireless Broadband Alliance Ltd., "Wi-Fi Roaming—from 'old school' to 'new opportunities'", https://wballiance.com/wi-fi-roaming-from-old-school-to-new-opportunities/, downloaded Mar. 5, 2020, 8 pages.

Wikipedia, "SRV record", https://en.wikipedia.org/wiki/SRV_record, Jun. 4, 2020, 4 pages.

S. Winter et al., "Dynamic Peer Discovery for RADIUS/TLS and RADIUS/DTLS Based on the Network Access Identifier (NAI)", Internet Engineering Task Force (IETF), Request for Comments: 7585, Category: Experimental, ISSN: 2070-1721, Oct. 2015, 32 pages.

S. Winter et al., "Transport Layer Security (TLS) Encryption for RADIUS", Internet Engineering Task Force (IETF), Request for Comments: 6614, Category: Experimental, ISSN: 2070-1721, May 2012, 22 pages.

B. Aboba et al., "The Network Access Identifier", Network Working Group, Request for Comments: 4282, Obsoletes 2486, Category: Standards Track, Dec. 2005, 16 pages.

WBA Members, "WBA OpenRoaming", Roaming Work Group (RWG), Version: draft 1.0, Mar. 2020, 22 pages.

"LTE and EPC Roaming Guidelines," GSM Association, Official Document IR.88—LTE and EPC Roaming Guidelines, Version 20.0, Oct. 15, 2019, 98 pages.

WRIX-n Team, "WRIX-n Network and AAA Focus," Wireless Broadband Alliance, WBA Members, Document status: Final v1.00, Aug. 2, 2017, 36 pages.

Roaming Evolution Project, "WRIX PKI Certificate Policy Roaming Evolution," Wireless Broadband Alliance, WBA Roaming Work Group, Document status: Final (Approved), Version: 1.0, Jul. 2019, 91 pages.

Roaming Evolution, "PKI & RadSec Operator Deployment Guidelines," Wireless Broadband Alliance, WBA, Version: 1.0, Document status: Final, Feb. 2020, 29 pages.

Roaming Evolution, "PKI & RadSec Operator Deployment Guidelines," Wireless Broadband Alliance, WBA, Version: 2.0.0, Document status: Final, Jun. 2020, 28 pages.

Roaming Evolution, "PKI & RadSec End Entity Deployment Guidelines," Wireless Broadband Alliance, WBA, Version: 0.01, Document status: [Draft], Feb. 2020, 18 pages.

M. Mealling, "Dynamic Delegation Discovery System (DDDS) Part Four: The Uniform Resource Identifiers (URI) Resolution Application," Network Working Group, Request for Comments: 3404, Obsoletes: 2915, 2168, Category: Standards Track, Oct. 2002, 18 pages.

M. Mealling, "Dynamic Delegation Discovery System (DDDS) Part Two: The Algorithm," Network Working Group, Request for Comments: 3402, Obsoletes: 2915, 2168, Category: Standards Track, Oct. 2002, 17 pages.

M. Mealling, et al.,"The Naming Authority Pointer (NAPTR) DNS Resource Record," Network Working Group, Request for Comments: 2915, Updates: 2168, Category: Standards Track, Sep. 2000, 18 pages.

M. Mealling, "Dynamic Delegation Discovery System (DDDS) Part One: The Comprehensive DDDS," Network Working Group, Request for Comments: 3401, Updates: 2276, Obsoletes: 2915, 2168, Category: Informational, Oct. 2002, 6 pages.

B. Aboba, et al., "RADIUS (Remote Authentication Dial In User Service) Support For Extensible Authentication Protocol (EAP)," Network Working Group, Request for Comments: 3579, Updates: 2869, Category: Informational, Sep. 2003, 46 pages.

C. Rigney, et al., "Remote Authentication Dial In User Service (RADIUS)," Network Working Group, Request for Comments: 2865, Obsoletes: 2138, Category: Standards Track, Jun. 2000, 76 pages.

D. Nelson, et al., "Common Remote Authentication Dial In User Service (RADIUS) Implementation Issues and Suggested Fixes," Network Working Group, Request for Comments: 5080, Updates: 2865, 2866, 2869, 3579, Category: Standards Track, Dec. 2007, 28 pages.

S. Cheshire, et al., "DNS-Based Service Discovery," Internet Engineering Task Force (IETF), Request for Comments 6763, Category: Standards Track, ISSN: 2070-1721, Feb. 2013, 49 pages.

P. Mockapetris, "Domain Names—Implementation and Specification," Network Working Group, Request for Comments: 1035, Obsoletes: RFCs 882, 883, 973, Nov. 1987, 55 pages.

R. Rosenbaum, "Using the Domain Name System To Store Arbitrary String Attributes," Network Working Group, Request for Comments: 1464, May 1993, 4 pages.

A. Gulbrandsen, et al., "A DNS RR for specifying the location of services (DNS SRV)," Network Working Group, Request for Comments: 2782, Obsoletes: 2052, Category: Standards Track, Feb. 2000, 12 pages.

* cited by examiner

(12) United States Patent

TECHNIQUES TO FACILITATE OPENROAMING INTEGRATION INTO A WIRELESS ROAMING INTERMEDIARY EXCHANGE DATA-CLEARING AND FINANCIAL-SETTLEMENT ARCHITECTURE

CROSS-REFERENCE TO RELATED APPLICATION

This application claims the benefit of priority under 35 U.S.C. § 119 to U.S. Provisional Patent Application Ser. No. 62/988,451, filed on Mar. 12, 2020, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases and as access network resources are shared among multiple network providers, efficient management of communication resources becomes more critical. In particular, there are significant challenges in managing service discovery for wireless networking architectures in which network services may vary across different network providers.

DESCRIPTION OF EXAMPLE EMBODIMENTS

Overview

A Domain Name System (DNS) Name Authority Pointer (NAPTR) technique is defined to enable the co-existence of OpenRoaming™ with existing Wireless Broadband Alliance (WBA) architectures that implement Wireless Roaming Intermediary eXchange (WRIX) architectures, including the interconnect architecture (WRIX-I), the data-clearing architecture (WRIX-D), and the financial-settlement architecture (WRIX-F). The data-clearing and financial-settlement architectures can be referred to herein collectively as a 'WRIX-D/F' architecture. Data-clearing (D) and financial-settlement (F) services may be referred to herein using a 'D/F' nomenclature.

Techniques herein provide multiple features involving the utilization of service records that may be configured for one or more DNS servers. In one embodiment, techniques herein may provide for the ability to utilize a DNS service record to indicate that a domain does not support a particular service. For example, the service may be a standardized interoperable service, such as WRIX-D/F services, that may not be supported by a domain. The presence of a service record that indicates that a WRIX-D/F service is not supported by a domain can be used to influence the routing of Remote Authentication Dial-In User Service (RADIUS) messages.

In one embodiment, techniques herein may provide for the ability to utilize a DNS service record to indicate that a particular non-standardized or proprietary inter-operable service or protocol is available or supported by a particular domain. For example, in some instances, proprietary services/protocols for performing data-clearing and/or financial-settlement can be utilized between two or more domains, such as between a Visited Network Provider (VNP) and one or more Home Service Provider(s) (HSP(s)) in order to facilitate such services for one or more roaming users. In some instances, a non-standardized or proprietary service/protocol may represent a service/protocol provided by a provider that is not standardized, published, and/or publicly known.

In one embodiment, a method is performed, which may include querying, by an application endpoint, a DNS server to determine support for a service for a domain; and obtaining, by the application endpoint from the DNS server, an explicit indication that one of: the service is not supported for the domain; or the service is proprietary and is supported for the domain. The explicit indication is included in at least one DNS Name Authority Pointer (NAPTR) record.

The DNS NAPTR record may include an application service tag that identifies the service and may include an application protocol tag that is used to identify whether the service is not supported or is proprietary and is supported for the domain. In some instances, the service may be a non-standardized interoperable service operational across a plurality of domains. When the service is not supported, the application protocol tag can be set to a "null" text string. When the service is proprietary and is supported, the application protocol tag can be set to a "proprietary" text string.

EXAMPLE EMBODIMENTS

The OpenRoaming™ network architecture was conceived as a system built on an assumption of best effort, settlement free access. Under an OpenRoaming network architecture, it may be advantageous to incentivize the deployment of high quality, well-engineered wireless networks. In contrast, conventional roaming systems are typically based on an offline exchange of inter-operator tariffs.

The Wireless Broadband Alliance (WBA) has taken the proactive step of accelerating the definition, development and operation of a Wi-Fi® federation. The goals of such include:
- Growing Wi-Fi® Roaming Business
- Promoting service provider (SP)—Enterprise Convergence
- Building mass—in which more players may support Wi-Fi® Roaming
- Promoting Passpoint™ deployment
- Solving secure auto-onboarding for the industry This effort takes various parallel developments by the WBA and defines a set of common procedures that then describe the operation of the federation.

The OpenRoaming networking architecture has been transferred to WBA as a solution to provide WRIX-I services. In addition, WBA defines WRIX-D/F services for data-clearing and financial-settlement services. Generally, data-clearing services may involve an exchange of session information for roaming user(s) that can be utilized to provide wholesale billing validation, reconciliation, and settlement between roaming partners (e.g., between a VNP and an HSP) for the roaming user(s) (e.g., determining/reconciling data, service, etc. usage for roaming user(s) for an HSP system that connect to and utilize services of a VNP system). Generally, financial-clearing services may involve an exchange of invoices, payments, and foreign exchange to facilitate financial exchanges between roaming partners for roaming user(s).

While the WRIX-I architecture is fully defined (utilizing RADIUS-based Authentication, Authorization, and Accounting (AAA) services) and can be dynamically discovered, the WRIX-D/F architecture is not fully defined. In some instances, one or both of a data-clearing and/or a financial-settlement service may utilize unspecified/non-standardized inter-operable protocols/services that are agreed upon bilaterally between roaming partners. Thus, it can be challenging to be able to support dynamic discovery when a well-defined or standardized protocol may not be supported between a discoverer and a discoveree for certain services.

Hence, what is needed is the dynamic discovery of the OpenRoaming network architecture to coexist within architectures that may involve ill-defined and static relationships for settlement and clearing. Techniques presented herein may enable OpenRoaming integration in a WRIX-D/F architecture through the use of various service records that can be utilized to explicitly indicate whether a service is not supported for a domain or whether a service is a non-standardized/proprietary inter-operable service that is supported for a domain.

Figure 1:
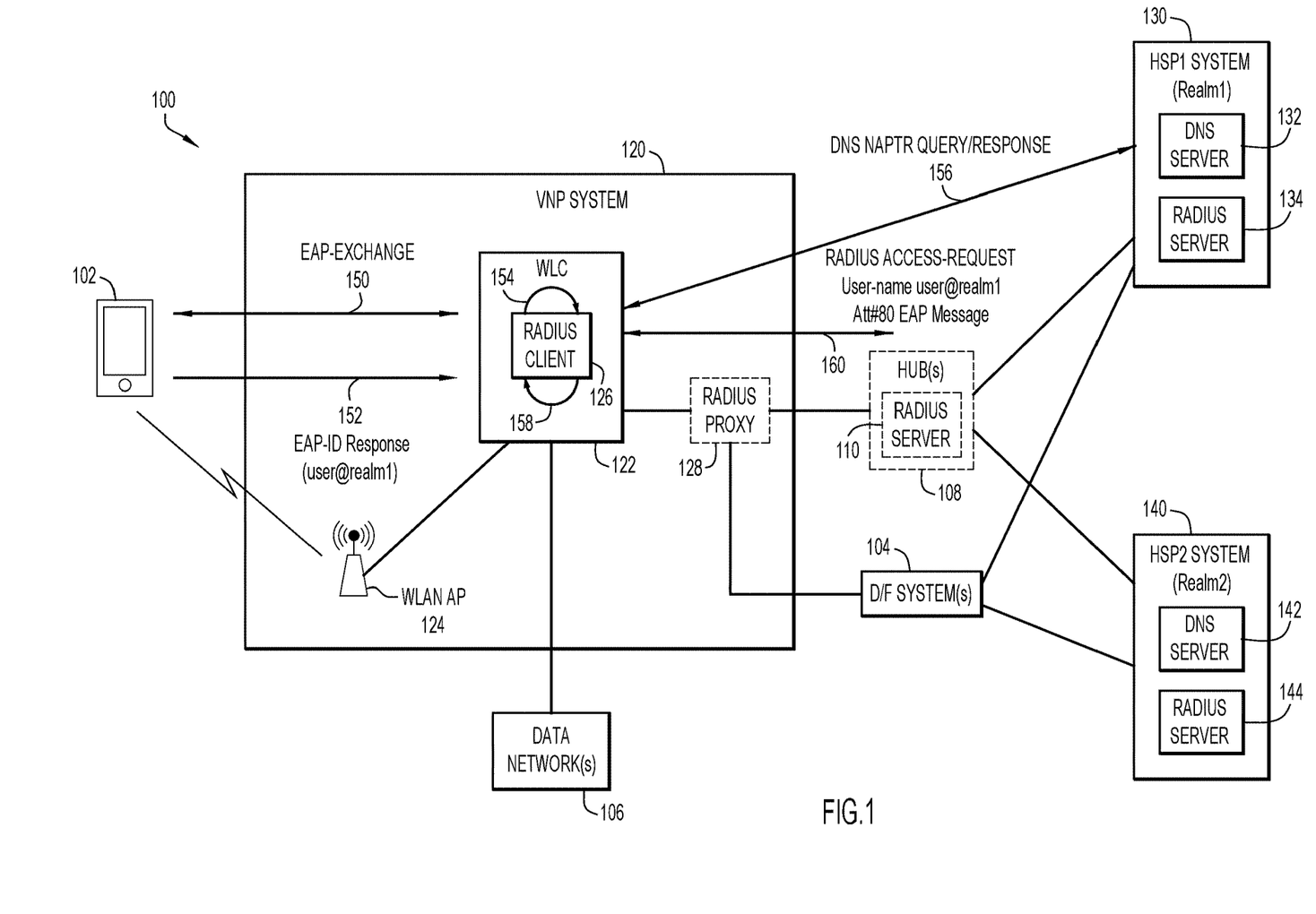
FIG. 1 is a block diagram of a system in which techniques that may facilitate OpenRoaming integration into a Wireless Roaming Intermediary Exchange (WRIX) data-clearing and financial-settlement architecture may be implemented, according to an example embodiment.

Referring to FIG. 1, FIG. 1 is a block diagram of a system 100 in which techniques that facilitate OpenRoaming integration into a WRIX-D/F architecture may be implemented, according to an example embodiment. In at least one embodiment, system 100 may include a user equipment (UE) 102, one or more D/F system(s) 104, one or more data network(s) 106, a Visited Network Provider (VNP) system 120, and various Home Service Provider (HSP) systems, such as a first HSP system (HSP1) 130 and a second HSP system (HSP2) 140. VNP system 120 may be referred to herein interchangeably as VNP 120. HSP1 system 130 may be referred to herein interchangeably as HSP1 130 and HSP2 system 140 may be referred to herein interchangeably as HSP2 140.

The VNP system 120 may include a wireless local area network controller (WLC) 122 and a wireless local area network (WLAN) access point (AP) 124. WLC 122 may be configured with a RADIUS client 126. In some instances, a RADIUS proxy 128 (or multiple RADIUS proxies) may be configured for the VNP system 120. The RADIUS proxy 128 may proxy signaling between one or more RADIUS client(s) and RADIUS server(s). The HSP1 system 130 may be considered a first domain associated with a first realm (realm1) and may include a DNS server 132 and a RADIUS server 134. The HSP2 140 may be considered a second domain associated with a second realm (realm2) and may also include a DNS server 142 and a RADIUS server 144. Although one VNP and two HSPs are illustrated in FIG. 1, it is to be understood that any number of VNPs and HSPs may be present in system 100; the number of VNP/HSPs is provided for illustrative purposes only.

Generally, WLAN AP 124 may interface with WLC 122, which may further interface with D/F system(s) 104, and external data network(s) 106. WLC 122 may also interface with HSP1 130 and HSP2 140 directly and/or indirectly via any combination of RADIUS proxies (e.g., RADIUS proxy 128) and/or hub(s) 108.

UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may be configured with hardware (e.g., communications units, receiver(s), transmitter(s), antenna(s) and/or antenna arrays, processor(s), memory element(s), baseband processor(s) (modems), etc.)], software, logic, and/or the like (e.g., a wireless wide area network (WWAN) (e.g., cellular) communications unit, a WLAN (e.g., Wi-Fi®), etc.) to facilitate over-the-air Radio Frequency (RF) connections with any combination of access networks, such as a WLAN facilitated via WLAN AP 124.

WLAN AP 124 may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WLAN connections (e.g., Wi-Fi® connections) with one or more devices, such as UE 102).

D/F system(s) 104 may provide functionality for data-clearing and financial-settlement services. In some instances, D/F system(s) 104 may implement standardized WRIX-D/F services. In still some instances, D/F system(s) 104 may implement non-standardized/proprietary inter-operable D/F services. In various embodiments, data network(s) 106 may be any combination of the Internet, an Ethernet network, Ethernet switching system(s), and/or the like.

Generally, WLC 122 may provide/be responsible for wireless LAN functions such as, WLAN-based access authentication services, authorization services, intrusion prevention, RF management, and/or the like in which various authentication/authorization services may be performed via RADIUS client 126. RADIUS server 134 for HSP1 130 and RADIUS server 144 for HSP2 may also facilitate authentication/authorization services. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device.

Generally, a DNS server, such as DNS server 132 and DNS server 142 may provide lookup services for system resources (e.g., hosts, services, functions, etc.) to provide resource records for various DNS queries. In some instances, resource records may include 'A' and 'AAAA' resource records in an which 'A' record may define an IP version 4 (IPv4) host address and an 'AAAA' resource record may define an IP version 6 (IPv6) host address. Resource records may also include NAPTR resource records, as defined according to Internet Engineering Task Force (IETF) Request For Comments (RFC) 3403.

The OpenRoaming architecture is a system that is based on dynamic discovery of RADIUS security (RadSec or RADSEC) peers (e.g., RADIUS client 126 and RADIUS servers 134, 144) using techniques as provided by Internet Engineering Task Force (IETF) Request For Comments (RFC) 7585. The terms RadSec client and RADIUS client may be used herein interchangeably. Additionally, the terms RadSec server and RADIUS server may be used herein interchangeably.

The OpenRoaming architecture defines the use of multiple Roaming Consortium Organization Identifiers (RCOIs) to facilitate the implementation of policy across a federation (e.g., a group of trusted providers such as identity providers, service providers, etc.), such as:

OpenRoaming-Paid: BA-A2-D0
OpenRoaming-Free: 00-40-96

A VNP that advertises the OpenRoaming-Free RCOI may not expect to be remunerated for providing Wi-Fi® access to roaming subscribers. Conversely, all VNPs that advertise the OpenRoaming-Paid RCOI are to support WRIX-D/F functionality in which support either can be provide by the VNPs or outsourced to a WRIX hub provider (e.g., a third-party, etc. provider that provides WRIX-D/F services). Such D/F functionality for the system of FIG. 1 may be provided via D/F system(s) 104. In some embodiments, one or more hub(s) 108 may be implemented for system 100, which, in some instances, may be configured with a RADIUS server 110. Hub(s) 108 may be operated by hub providers in order to facilitate D/F functionality A goal of the OpenRoaming architecture is to provide a global federation to interconnect the unprecedented footprint of millions of Wi-Fi® hotspots available worldwide. The OpenRoaming architecture enables scalable policies to be implemented by both a VNP and a HSP (e.g., HSP1, HSP2, etc.). The realization of policy controls in the OpenRoaming federation is a balance between the requirements for fine grain policy enforcement against the potential impact of policy enforcement on the user experience. Note, that this is a particular issue, as the definition of device behavior on receiving an EAP-FAILURE (Extensible Authentication Protocol-FAILURE) packet is not currently well-defined.

A preferred approach for realizing a VNP-based authorization policy is to use RCOI-based policies and, where a VNP does not want to authorize all users associated with a particular RCOI, to avoid broadcasting that RCOI and instead use whitelists of permitted Network Access Identifier realms (NAI-realms) to define the subset of authorized users associated with a particular RCOI. The normal Passpoint™ access network selection rules can then be used to ensure that OpenRoaming users may not attempt to authenticate to a network for which they are not authorized and, hence, may not suffer any degraded user experience associated with implementing authorization controls.

A HSP that enables an authoritative RadSec server to be dynamically discovered is permitted to implement authorization policies that forbid access from particular access networks. This "black list" of prohibited WBA identities (WBA-IDs) is to be shared with WBA.

The OpenRoaming architecture is built on a foundation of RadSec secured using the WBA's Public Key Infrastructure (PKI) in which all OpenRoaming participants are to be identified using their WBA-ID. The OpenRoaming architecture takes the previously defined optional support of SubjectAltName NAIrealm in RadSec server certificates (that can be used by the RadSec server to prove that it is authoritative for a particular realm or set of realms) and stipulates support of such by HSPs or hubs that are providing a bilaterally agreed service to those HSPs.

The OpenRoaming architecture further takes the previously defined optional support for dynamic RadSec server discovery and stipulates that all HSPs that join the federation are to configure their DNS entries to permit the automatic discovery of the RadSec server IP address(es) that is/are authoritative for their realms. The OpenRoaming architecture additionally defines WBA defined DNS application service and application protocol tags to be able to signal to a querying system that a HSP does not support settlement for OpenRoaming service in accordance with embodiments herein.

Instead of using DNS NAPTR queries/responses to provide a service record that indicates that a particular domain supports a particular standardized service, embodiments herein provide for the ability to use DNS NAPTR queries/responses to indicate a lack of support for a particular standardized service or to indicate support for a non-standardized/proprietary service.

In particular, embodiments herein provide for the definition new application service tags and application protocol tags, as illustrated in TABLE 1, below, in which the reception of a particular application protocol tag (e.g., by RADIUS client 126) can be used to explicitly indicate either that a domain does not support a service identified by the service tag or that a domain supports a non-standardized/proprietary inter-operable service. As referred to herein a 'tag' may be characterized as any text and/or character string that may be limited to 32 characters can begin with an alphabetic character and may formatted in any manner and/or variation to identify and/or convey any type of information.

TABLE 1

| APPLICATION SERVICE TAG | WRIX APPLICATION |
| --- | --- |
| [x-wba + wrixdf] | WRIX Data Clearing & Financial Settlement |
| [x-wba + wrixd] | WRIX Data Clearing |
| [x-wba + wrixf] | WRIX Financial Settlement |
| APPLICATION PROTOCOL TAG | WRIX PROTOCOL |
| [x-null.tls] | No WRIX protocol supported |
| [x-proprietary.tls] | A proprietary protocol is used to support the WRIX D/F service |

By utilizing application service and protocol tags as illustrated in TABLE 1, above, the routing of WRIX-I signaling may be optimized.

For example, a response obtained by RADIUS client 126 for a NAPTR query could be:
$idp.com
;; order pref flags service regexp replacement
IN NAPTR 10 50 "S" "x-wba+wrixdf:x-null.tls" " " <any dummy realm>
IN NAPTR 20 50 "S" "aaa+auth:radius.tls.tcp" " " _radiustls._tcp.roaming.idp.com For the above example the service tag "x-wba+wrixdf" in the first service record can be used to identify a WRIX-D/F service and the protocol tag "x-null.tls" can be used to explicitly indicate that the domain does not support the WRIX-D/F service and, hence, does not have the capability to charge an end-user.

During operations performed between a VNP and an HSP, if the WRIX-D/F service is not supported, a RADIUS client, such as RADIUS client 126, can be defined to use dynamic discovery in order to dynamically identify a RadSec server (e.g., RADIUS server 134 or RADIUS server 144, depending on the domain queried). Otherwise, if there is no service record provided to indicate that WRIX-D/F is not supported such as "x-wba+wrixdf:x-null.tls" or a service tag is included that WRIX-D is supported using a well-defined protocol, but WRIX-F is not so supported (e.g., "x-wba+wrixd:x-wrixd.tls" and "x-wba+wrixf:x-null.tls"), then dynamic routing rules are not used and instead pre-configured routing of RADIUS can be performed by the RADIUS client 126.

In some implementations, if HSP supported proprietary data-clearing and financial-settlement services are to be bilaterally agreed upon between the HSP and a VNP (e.g., between HSP1 130 and VNP 120), then an a response obtained by RADIUS client 126 for a NAPTR query could be:
$idp.com
order pref flags service regexp replacement
IN NAPTR 10 50 "S" "x-wba+wrixdf:x-proprietary.tls" " " <any dummy realm>
IN NAPTR 20 50 "S" "aaa+auth:radius.tls.tcp" " " _radiustls._tcp.roaming.idp.com Such techniques involving "null" or "proprietary" application protocol tags can be used in advance of the WBA defining interoperable protocol(s) for WRIX-D and WRIX-F that can be discovered using standard NAPTR records, For example, once defined by WBA, a NAPTR response could be:
$idp.com
;; order pref flags service regexp replacement
IN NAPTR 10 50 "S" "x-wba+wrixd:x-wrixd.tls" " " _wrixd._tls.udr-endpoint.idp.com
IN NAPTR 10 50 "S" "x-wba+wrixf:x-wrixf.tls" " " _wrixd._tls.invoice.idp.com
IN NAPTR 20 50 "S" "aaa+auth:radius.tls.tcp" " " _radiustls._tcp.roaming.idp.com However, such defining responses as above may take some time for the WBA to define. In the interim period, the absence of a service record may not be used to indicate that a system does not support some specific capability.

Thus, embodiments herein define a system to consume the NAPTR records defined above in TABLE 1 in which OpenRoaming takes the previously defined recommended ordering of RADIUS routing and provides that this is to be supported by RadSec clients, but with additional optimizations of when to use dynamic discovery of a RadSec server (RADIUS server). Such additional optimizations may include that a RadSec client (RADIUS client), such as RADIUS client 126, first compares a particular user's realm that is to be used an Access-Request with a list of static routing entries for RadSec servers that may be configured (e.g., manually) for RADIUS client 126.

If the realm does not match a static routing entry, the RADIUS client 126 performs a NAPTR query (e.g., DNS Query Section: Query Domain Name: <the realm>, Query Type: NAPTR) with the DNS server for the realm to determine a RadSec server for the particular realm according to the WBA's Agent Deployment Guidelines.

Based on the NAPTR query, if a NAPTR record is signaled from the DNS server for the particular realm and obtained by RADIUS client 126 in which the NAPTR record contains a service/protocol tag including "x-wba+wrixdf:x-proprietary.tls" and the VNP 120 supports one or more of the OpenRoaming-Settled RCOIs, then RADIUS client 126 is to use a "route of last resort" to identify a RadSec server, which may typically be provided via a hub provider.

If a NAPTR record is signaled from the DNS server for the particular realm and obtained by RADIUS client 126 in which 1) the NAPTR record does not service/protocol tag including "x-wba+wrixdf:x-proprietary.tls" is returned or if the VNP 120 does not support one or more of the OpenRoaming-Settled RCOIs or 2) the NAPTR record contains a service tag "aaa+auth" together with a NAPTR record with the service/protocol tag "xwba+wrixdf:x-null.tls", then the RADIUS client 126 is to look up the "aaa+auth" service record to dynamically identify the RadSec server for the particular realm. For example, the RADIUS client could perform a DNS service (SRV) lookup on the "aaa+auth" service record to identify the RadSec server, which is then looked-up again using an 'A' request to identify the IP address of the RadSec server. Otherwise, if none of the previous operations are triggered, then the RadSec client is to use a static "route of last resort" to identify the RadSec server for the particular realm.

Consider an operational example involving UE 102 in which an Extensible Authentication Protocol (EAP) Exchange (150) is performed between UE 102 and an application endpoint, such as RADIUS client 126, for authenticating UE 102 to connect to a WLAN provided via WLAN AP. For the EAP-Exchange, UE 102 may communicate an EAP-ID response to the RADIUS client 126, as shown at 152, that includes an identity for UE 102 for a given realm, say Realm1 associated with HSP1 130, such as 'user@realm1.'

At 154, RADIUS client 126 compares a the user's realm 'realm1' with a list of static routing entries for RadSec servers that may be configured (e.g., manually) for RADIUS client 126. Assuming for the present example, that the user's realm is not identified in the list, RADIUS client 126 performs DNS NAPTR query for the realm1 via DNS server 132 in which a DNS NAPTR record is provided in a response, as shown at 156. At 158, RADIUS client identifies a RadSec/RADIUS server for the realm based on the DNS NAPTR record obtained via the response using various operations as discussed above.

For example, at 158, if the NAPTR record contains a service/protocol tag including "x-wba+wrixdf:x-proprietary.tls" and the VNP 120 supports one or more of the OpenRoaming-Settled RCOIs, then RADIUS client 126 is to utilize a "route of last resort" to identify the RadSec server. If 1) the NAPTR record does not service/protocol tag including "x-wba+wrixdf:x-proprietary.tls" or if VNP 120 does not support one or more of the OpenRoaming-Settled RCOIs or 2) the NAPTR record contains a service tag "aaa+auth" together with a NAPTR record with the service/protocol tag "xwba+wrixdf:x-null.tls", then the RADIUS client 126 can look up the "aaa+auth" service record to dynamically identify the RadSec server for the particular realm. Otherwise, if NAPTR does not meet any of these criteria, then the RADIUS client can use a static "route of last resort" to identify the RadSec server for the particular realm.

In various instances, depending on implementation, as discussed below for FIGS. 2 and 3, the RadSec server can be identified as being provided via an HSP, such as RADIUS server 134 for HSP1 130, or can be identified as being provided via a VNP or a HSP hub provider, such as via RADIUS server 110 for hub 108. At 160, RADIUS client 126 may proceed with authentication operations for the UE 102 by communicating a RADIUS Access-Request to the identified RADIUS server (e.g., RADIUS server 134 or RADIUS server 110, depending on implementation) including the user-name 'user@realm1' with an EAP-message attribute 80 set and subsequent authentication operations may be performed for the UE 102 using standards-based EAP processes.

Accordingly, embodiments herein may enable the co-existence of OpenRoaming services with existing WBA architectures that implement WRIX-I (AAA-RADIUS), WRIX-D and WRIX-F services in which the WRIX D/F services may utilize unspecified/proprietary protocols, using a DNS NAPTR approach in which "null" or "proprietary" application protocol tags may be utilized in order to identify a RadSec/RADIUS server by an application endpoint, such as a RadSec/RADIUS server for a particular end domain/realm.

OpenRoaming supports different deployment options designed to enable the smooth migration of the technology across a current set of stakeholders. For example, if a VNP is OpenRoaming enabled, it may implement the dynamic discovery and RADIUS routing approach discussed herein.

Figure 2:
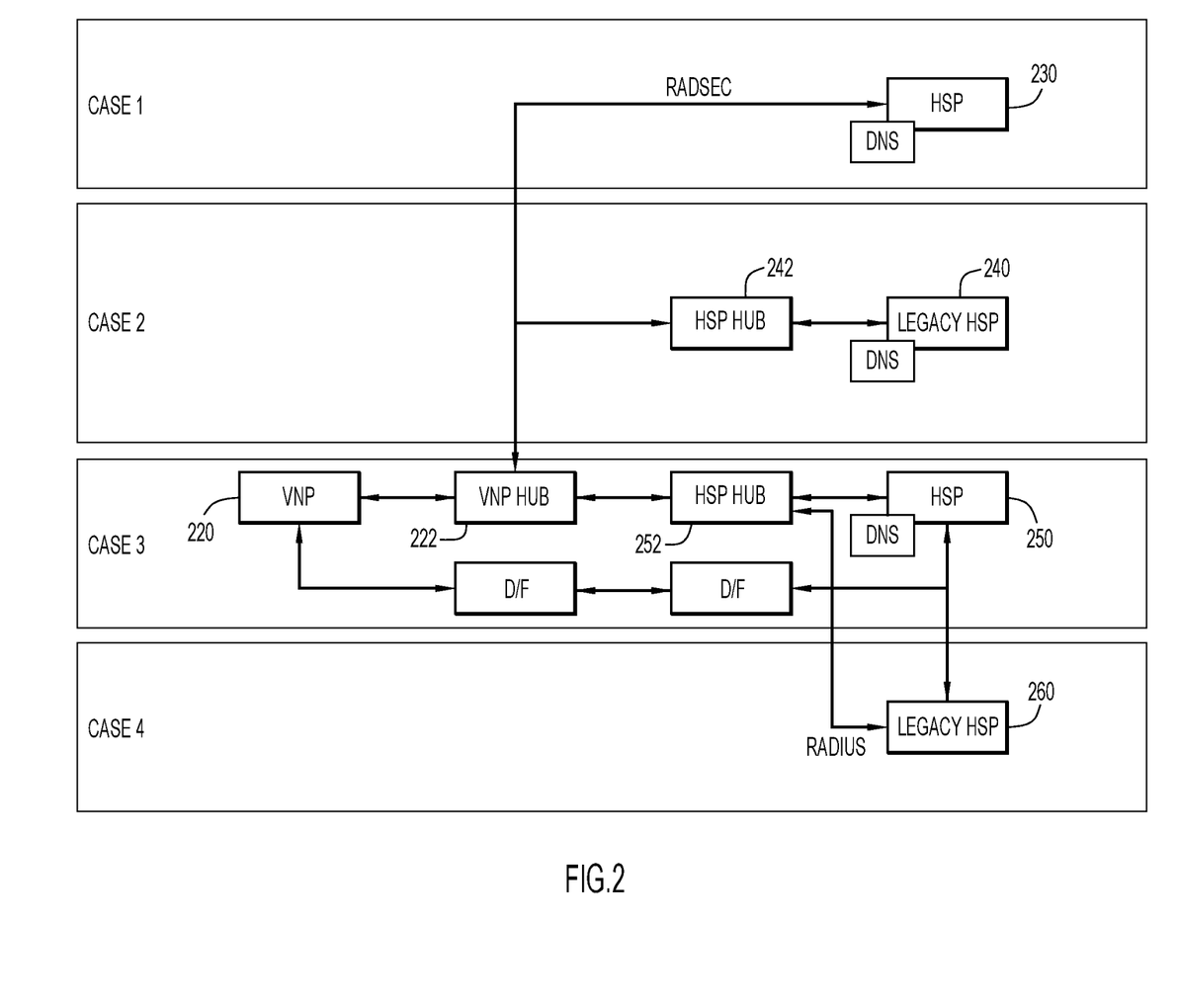
FIG. 2 is a diagram illustrating various roaming scenarios associated with an OpenRoaming enabled Visited Network Provider (VNP) to facilitate OpenRoaming integration for a WRIX data-clearing and financial-settlement architecture, according to various example embodiments.

FIG. 2 illustrates various example roaming scenarios that may occur when a VNP has been enhanced with OpenRoaming capabilities as described herein. Consider a first case (CASE 1) in which an OpenRoaming VNP 220 dynamically discovers an OpenRoaming enabled HSP 230 that indicates it does not support settlement-based authentication service (e.g., via DNS NAPTR record containing a "null" application protocol tag). In this case, the VNP 220 may use RadSec with the dynamically discovered HSP 230, which directly supports RadSec termination via a RADIUS server (not shown) provided for the HSP 230.

Consider a second case (CASE 2) in which the OpenRoaming VNP 220 dynamically discovers a legacy HSP 240 that indicates it does not support a settlement-based authentication service (e.g., via DNS NAPTR record containing a "null" application protocol tag). In this case, consider that the legacy HSP 240 has offloaded OpenRoaming RadSec termination to a HSP hub 242 provider and the DNS RadSec service record points to the HSP hub 242. In this case, the VNP 220 may use RadSec with the dynamically discovered HSP hub 242 (e.g., with a RADIUS server (not shown) provide for the HSP hub 242).

Consider a third case (CASE 3) in which the OpenRoaming VNP 220 dynamically discovers a HSP 250 that only includes the "x-wba+wrixdf" service tag in its DNS record (e.g., the "null" tag is not returned). Thus, the HSP 250 supports a settlement-based authentication service. In this case, the VNP 220 may use static routing rules to route RADIUS packets to the RadSec server (not shown) in its VNP hub 222 provider. The VNP hub 222 provider may then perform the same and statically route the RADIUS packets to a HSP hub 252 provider. Further, data-clearing and financial-settlement can be performed in this case by the VNP 220 utilizing WBA defined techniques.

Consider a fourth case (CASE 4) in which the OpenRoaming VNP 220 attempts to dynamically discover a legacy HSP 260, but no NAPTR record is returned (e.g., the legacy HSP 260 is not dynamically discoverable) or a NAPTR record is returned with a "proprietary" application protocol tag. In this case, the VNP 220 may use static routing rules to route RADIUS packets to the RadSec server in its VNP hub 222 provider. The VNP hub 222 provider may then perform the same and statically route the RADIUS packets to the HSP hub 252 provider.

Figure 3:
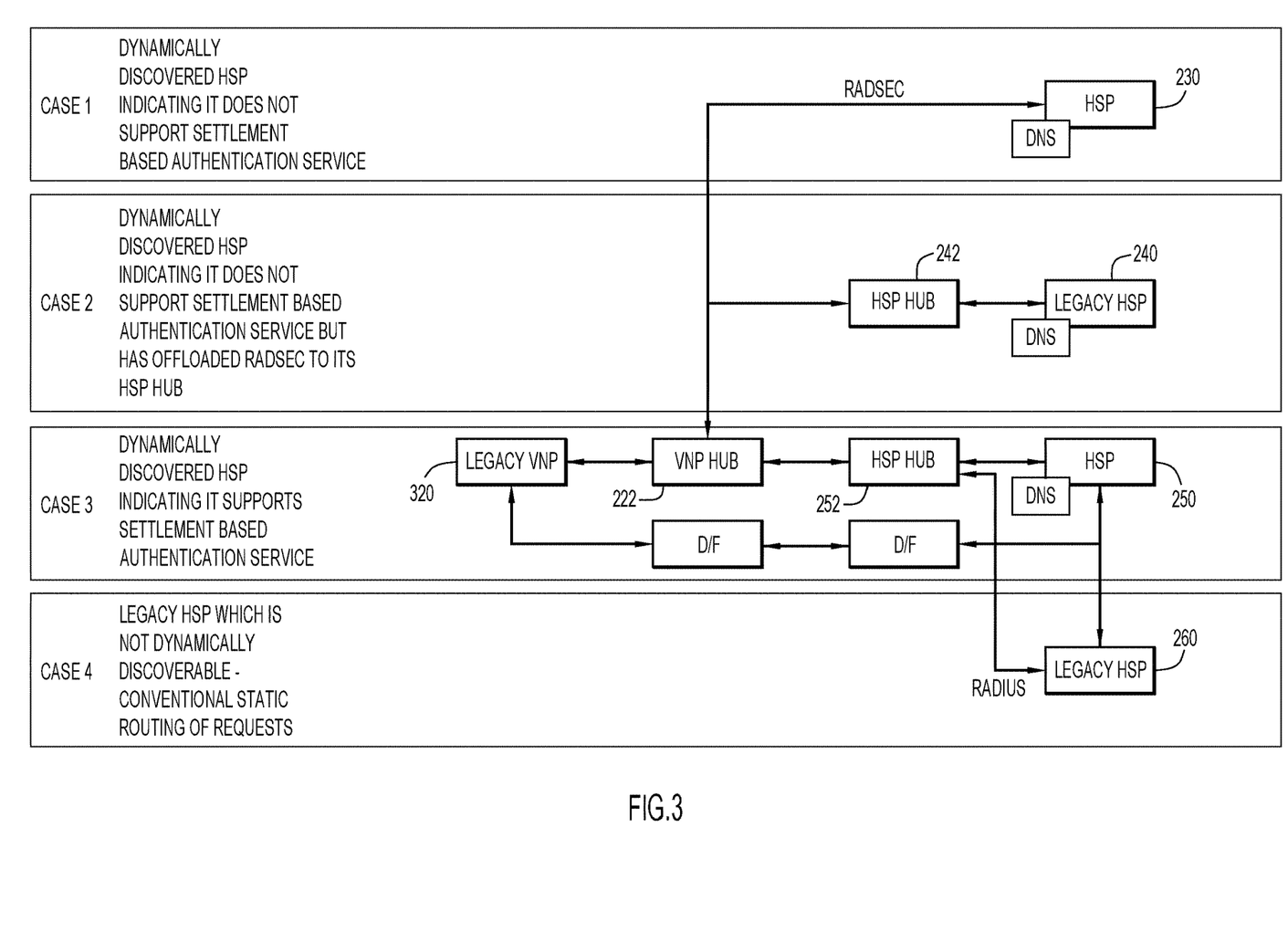
FIG. 3 is a diagram illustrating various roaming scenarios associated with a legacy VNP to facilitate OpenRoaming integration for a WRIX data-clearing and financial-settlement architecture, according to various example embodiments.

Thus, where a legacy VNP has not deployed OpenRoaming, techniques herein can still be deployed/implemented by a VNP Hub provider to support the 4 different HSP use cases of FIG. 2 (CASE 1, 2, 3, and 4), as illustrated in FIG. 3 for a legacy VNP 320.

OpenRoaming is targeted at conventional VNPs, but also the millions of HotSpots that today use a captive portal to define their own terms of service and require that each roaming user accepts those terms of service before connectivity is provided. However, instead of assuming each VNP can define terms of service, OpenRoaming defines a set of terms of service at a roaming federation level. These terms of service for the WBA federation define standardized acceptable use policies and terms of service for VNPs and HSPs.

Figure 4:
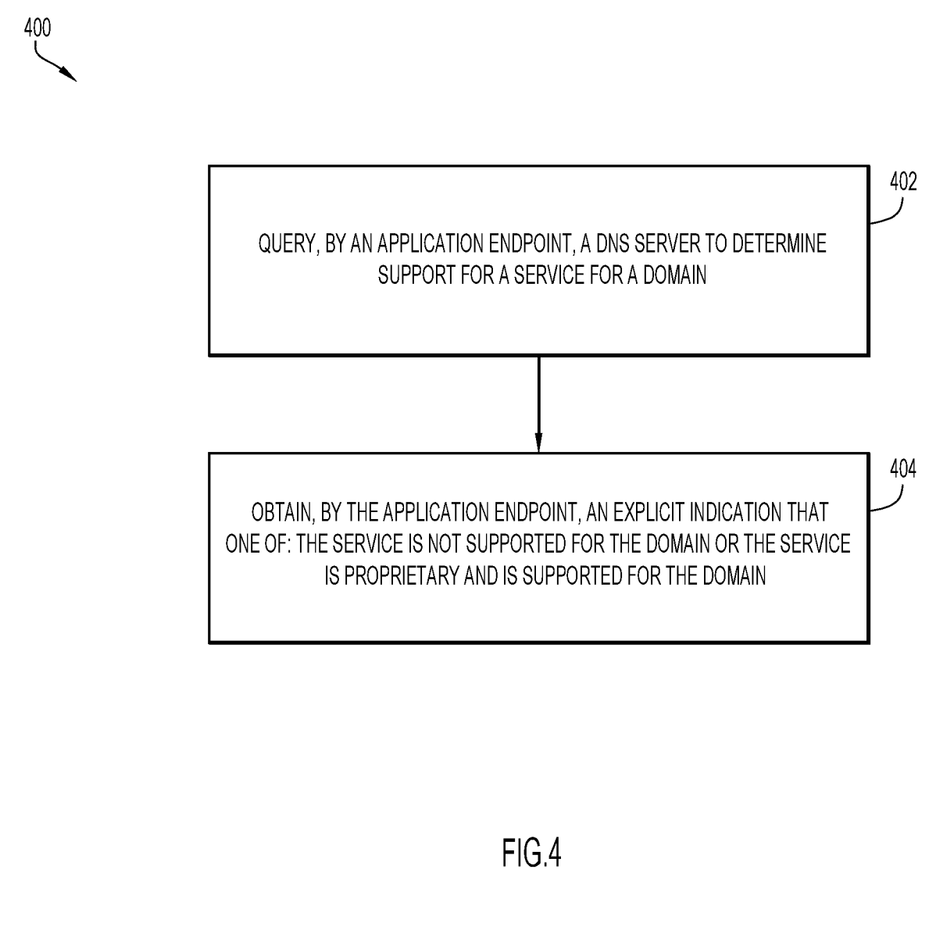
FIG. 4 is a flow chart depicting a method according to an example embodiment.

Referring to FIG. 4, FIG. 4 is a flow chart depicting a method 400 according to an example embodiment. In one embodiment, method 400 may be performed by an application endpoint. For example, in some instances an application endpoint may be a RadSec/RADIUS client, such as RADIUS client 126.

At 402, the method may include querying, by the application endpoint, a DNS server to determine support for a service for a domain (e.g., for an HSP). At 404, the method may include obtaining, by the application endpoint, an explicit indication that one of: the service is not supported for the domain; or the service is proprietary and is supported for the domain.

For instances in which the application endpoint is a RADIUS client, the method may enable the RADIUS client to determine a RADIUS server that is to facilitate authentication of a user equipment based on the explicit indication obtained from the DNS server. For example, based on the response, the application endpoint may determine any of a RADIUS server for an HSP (e.g., as discussed for CASE 1, above) that is to facilitate authentication of the UE, a RADIUS server for a HSP hub provider (e.g., as discussed for CASE 2, above) that is to facilitate authentication of the UE, or a RADIUS server for a VNP hub provider that is to facilitate authentication for the UE via a RADIUS server for a HSP hub provider (e.g., as discussed for CASEs 3 and 4, above).

Figure 5:
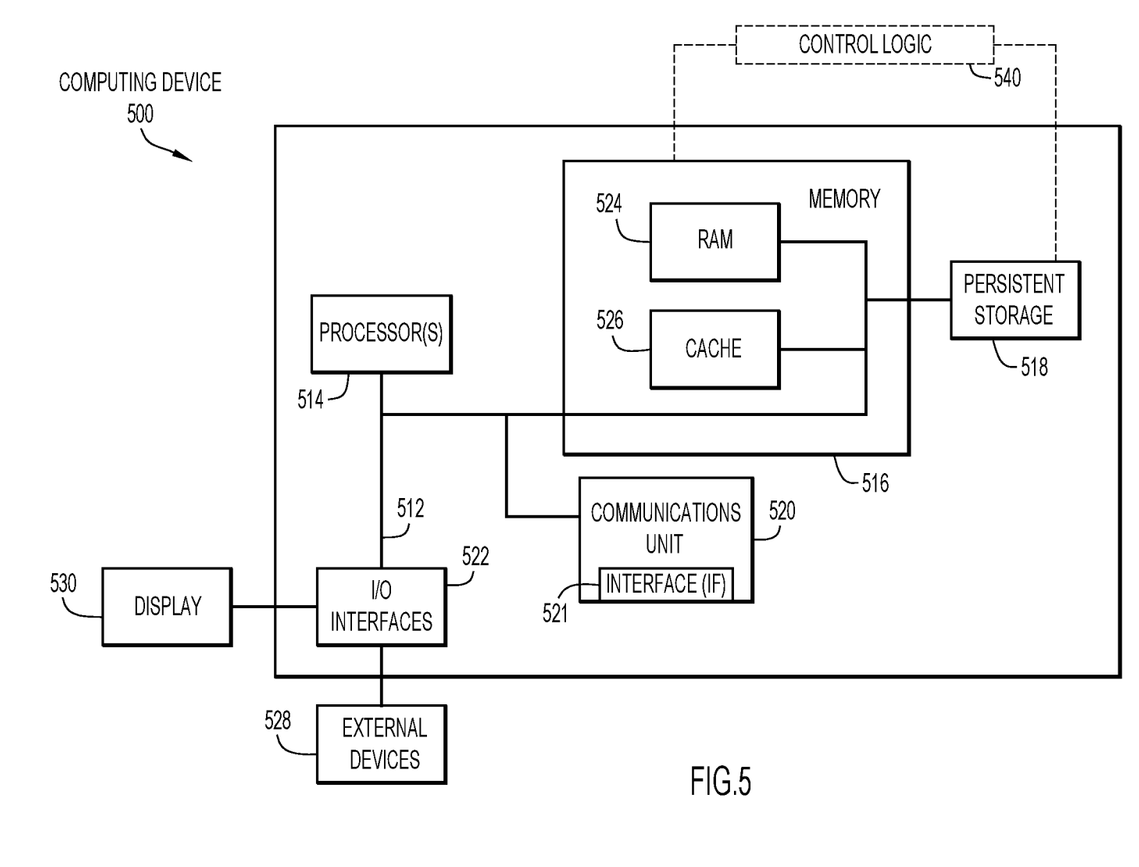
FIG. 5 is a hardware block diagram of a computing device that may perform functions associated with any combination of operations, in connection with the techniques depicted in FIGS. 1-4.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any elements/devices/nodes as discussed for the techniques depicted in connection with FIGS. 1-4, such as RADIUS client 126 of WLC 122, DNS server 132, RADIUS server 134, DNS server 142, RADIUS server 144, UE 102, etc. as shown in FIG. 1.

It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, at least one communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which may be inclusive on non-transitory computer readable storage media. In the depicted embodiment, memory 516, which may be inclusive of one or more memory element(s), includes random access memory (RAM) 524 and cache memory 526. In general, memory 516 can include any suitable volatile or non-volatile computer readable storage media. Instructions for control logic 540 may be stored in memory 516 and/or persistent storage 518 for execution by processor(s) 514.

When the processor(s) 514 execute control logic 540, the processor(s) 514 are caused to perform the operations described above in connection with FIGS. 1-4. For example, when computing device 500 is configured as a RadSec/RADIUS client, such as RADIUS client 126 as shown in FIG. 1, when the processor(s) 514 execute control logic 540, the processor(s) 514 are caused to perform operations such as querying, by the RADIUS client, a DNS server to determine support for a service for a domain (e.g., for an HSP); and obtaining, by the RADIUS client from the DNS server, an explicit indication that one of: the service is not supported for the domain; or the service is proprietary and is supported for the domain. The RADIUS client may determine a RADIUS server that is to facilitate authentication of a user based, at least in part, on the explicit indication obtained from the DNS server.

One or more programs and/or other logic may be stored in persistent storage 518 for execution by one or more of the respective computer processors 514 via one or more memory element(s) of memory 516. The persistent storage 518 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems, networks, and/or devices. In these examples, each communications unit 520 may include at least one interface (IF) 521, which may facilitate communications with systems, networks, and/or devices utilizing any combination of hardware, software, etc. to facilitate one or more connections for communications discussed herein. Accordingly, communications unit 520 may provide communications through the use of any combination of physical and/or wireless communications links.

interface(s) 522 may allow for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

In one form, a computer-implemented method is provided that may include querying, by an application endpoint, a Domain Name System (DNS) server to determine support for a service for a domain; and obtaining, by the application endpoint from the DNS server, an explicit indication that one of: the service is not supported for the domain; or the service is proprietary and is supported for the domain. In some instances, the service may be a non-standardized interoperable service operational across a plurality of domains.

The explicit indication may be included in at least one DNS Name Authority Pointer (NAPTR) record, which may include an application service tag that identifies the service and an application protocol tag that are used to identify whether the service is not supported or is proprietary and is supported for the domain. When the service is not supported, the application protocol tag may be set to a "null" text string. When the service is proprietary and is supported, the application protocol tag may be set to a "proprietary" text string. In various instances, the service may be any of a combined data-clearing and financial-settlement service, a data-clearing service, or a financial-settlement service.

In at least one instance, the application endpoint may be a Remote Authentication Dial-In User Service (RADIUS) client and the method may further include determining a RADIUS server that is to facilitate authentication of a user equipment based on the explicit indication obtained from the DNS server.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   querying, by an application endpoint, a Domain Name System (DNS) server to determine support for a service for a domain; and
   obtaining, by the application endpoint from the DNS server, an explicit indication that one of:
   the service is not supported for the domain; or
   the service is proprietary and is supported for the domain.

2. The method of claim 1, wherein the service is a non-standardized interoperable service operational across a plurality of domains.

3. The method of claim 1, wherein the explicit indication is included in at least one DNS Name Authority Pointer (NAPTR) record.

4. The method of claim 3, wherein the at least one DNS NAPTR record comprises an application service tag that identifies the service and an application protocol tag that are used to identify whether the service is not supported or is proprietary and is supported for the domain.

5. The method of claim 4, wherein when the service is not supported, the application protocol tag is set to a "null" text string.

6. The method of claim 4, wherein when the service is proprietary and is supported, the application protocol tag is set to a "proprietary" text string.

7. The method of claim 1, wherein the service is a combined data-clearing and financial-settlement service.

8. The method of claim 1, wherein the service is a data-clearing service.

9. The method of claim 1, wherein the service is a financial-settlement service.

10. The method of claim 1, wherein the application endpoint is a Remote Authentication Dial-In User Service (RADIUS) client, the method further comprising:
    determining a RADIUS server that is to facilitate authentication of a user equipment based on the explicit indication obtained from the DNS server.

11. One or more non-transitory computer readable storage media encoded with instructions that, when executed by a processor, cause the processor to perform operations, comprising:
    querying, by an application endpoint, a Domain Name System (DNS) server to determine support for a service for a domain; and
    obtaining, by the application endpoint from the DNS server, an explicit indication that one of:
    the service is not supported for the domain; or
    the service is proprietary and is supported for the domain.

12. The media of claim 11, wherein the explicit indication is included in at least one DNS Name Authority Pointer (NAPTR) record.

13. The media of claim 12, wherein the at least one DNS NAPTR record comprises an application service tag that identifies the service and an application protocol tag that are used to identify whether the service is not supported or is proprietary and is supported for the domain.

14. The media of claim 13, wherein when the service is not supported, the application protocol tag is set to a "null" text string.

15. The media of claim 13, wherein when the service is proprietary and is supported, the application protocol tag is set to a "proprietary" text string.

16. A system comprising:
    at least one memory element for storing data; and
    at least one processor for executing instructions associated with the data, wherein executing the instructions causes the system to perform operations, comprising:
    querying, by an application endpoint, a Domain Name System (DNS) server to determine support for a service for a domain; and
    obtaining, by the application endpoint from the DNS server, an explicit indication that one of:
    the service is not supported for the domain; or
    the service is proprietary and is supported for the domain.

17. The system of claim 16, wherein the explicit indication is included in at least one DNS Name Authority Pointer (NAPTR) record comprising an application service tag that identifies the service and an application protocol tag that are used to identify whether the service is not supported or is proprietary and is supported for the domain.

18. The system of claim 17, wherein when the service is not supported, the application protocol tag is set to a "null" text string, and when the service is proprietary and is supported, the application protocol tag is set to a "proprietary" text string.

19. The system of claim 16, wherein the service is a combined data-clearing and financial-settlement service.

20. The system of claim 16, wherein the application endpoint is a Remote Authentication Dial-In User Service (RADIUS) client, the operations further comprising:
    determining a RADIUS server that is to facilitate authentication of a user equipment based on the explicit indication obtained from the DNS server.

\* \* \* \* \*